3,086,960
COMPOSITIONS OF POLYAMIDES AND SULFIDES OF DIALKYLATED PHENOLS
Nelson C. Bletso, Kent, Ohio, assignor to The Goodyear Tire & Rubber Company, Akron, Ohio, a corporation of Ohio
No Drawing. Filed Apr. 22, 1960, Ser. No. 23,899
5 Claims. (Cl. 260—45.95)

This invention relates to the stabilization of synthetic linear polyamides and particularly to the stabilization of synthetic linear polyamides against tensile degradation developed at elevated temperatures when used to reinforce a rubbery material, especially in the construction of a pneumatic tire.

The polymers of the nylon type, that is the macromolecular synthetic linear polyamides prepared from polymerizable monoamino-carboxylic acids or their amide-forming derivatives or from suitable diamines and suitable dicarboxylic acids or amide-forming derivatives of these compounds, possess a number of physical properties such as toughness and high tensile strength which make them of great value in many applications and especially as a reinforcing element in the construction of a pneumatic tire. Preparation and use of such polymers are illustrated in United States Patents 2,071,250, 2,071,253, and 2,130,948. The polyamides described in these patents are high molecular weight polymers whic has a class are microcrystalline in structure. In general these polyamides have intrinsic viscosities above 0.4 where intrinsic viscosity is defined as in United States Patent 2,130,948.

Synthetic linear polyamides when exposed to elevated temperatures undergo degradation which impairs its tensile strength. The resulting loss in tensile materially affects the utility of rubbery articles containing synthetic linear polyamides, particularly rubber coated fabrics, and pneumatic tires where much dependence is placed upon maximum retention of toughness and tensile during service.

It is an object of this invention to stabilize the said high molecular weight synthetic linear polyamides against degradation, i.e. loss of tensile encountered upon exposure to elevated temperatures. Other objects will be apparent from the hereinafter description of the subject invention.

The objects of this invention are accomplished by incorporating in or applying to the surface of a synthetic linear polyamide a small amount of the sulfides of dialkylated phenols having the following general structural formula:

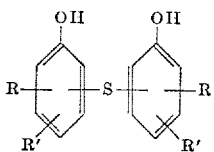

in which R and R' are alkyl groups containing from 1 to 5 carbon atoms. More particularly, from 0.1% to 2% of these sulfides of dialkylated phenols, based upon the weight of polyamide, is incorporated with the synthetic linear polyamide or applied to the surface of the fiber made therefrom.

The present invention resides in the discovery that incorporation of a small amount of a sulfide of a dialkylated phenol with a synthetic linear polyamide preserves its tensile strength, especially at elevated temperatures.

The following examples, in which all parts are by weight unless otherwise specified, are illustrative of various embodiments of the present invention.

*Example 1 (Control)*

An unstabilized type 6 (homopolymer of caprolactam) 1680 denier nylon cord made by twisting two 840 denier cables of nylon yarn and having a tensile strength of 25.3 pounds was aged at 400° F. in an oven. During the aging the nylon cord was stretched by means of a 200 gram weight attached to the lower end thereof. After a period of 13 minutes the cord broke in the oven indicating that the tensile strength had completely deteriorated. The 200 gram load represented a tensile pull necessary to permit the cord to return to its original length after cooling to room temperature.

*Example 2*

The nylon cord used in Example 1 was treated by immersion in a 10% acetone solution of bis(2-methyl-4-hydroxy-5-tertiary butyl phenyl) sulfide and then dried for 30 minutes in an oven heated at 400° F. while loaded with a 200 gram weight attached to the lower end thereof. The cord was removed from the oven and cooled to room temperature (72° F.) and then tested. The treated nylon had retained a tensile strength of 23.3 pounds pull and an elongation of 13.2% at 10 pounds tensile, and an elongation of 25.8% at break.

*Example 3*

The nylon cord used in Example 1 was immersed in a 10% acetone solution of a mixture of bis(2-methyl-4-hydroxy-5-tertiary butyl phenyl) sulfide, bis(2-hydroxy-3-tertiary butyl-6-methyl phenyl) sulfide, and 2-hydroxy-3-tertiary butyl-6-methyl phenyl) (2-methyl-4-hydroxy-5-tertiary butyl phenyl) sulfide and dried in an oven for 30 minutes at 400° F. while loaded with a 200 gram weight attached to the lower end thereof, and then removed and cooled to room temperature. The heat aged nylon cord had retained a tensile strength of 23.2 pounds per square inch, and an elongation of 13% at 10 pounds tensile, and an elongation of 25.5% at break.

The sulfides of the dialkylated phenols of this invention may be applied to the nylon yarn before testing by immersing the yarn in an acetone solution of the sulfide or the sulfide may be applied to the cord after the yarn has been twisted into a cord or the sulfide may be added to conventional adhesives applied to the nylon cord prior to being imbedded in a rubbery material. Any suitable organic solvent may be used in making a solution of the sulfide. The sulfide stabilizers of this invention may also be applied to the surface of the nylon in either yarn or cord form by adding a water suspension of the sulfides to a latex adhesive system. The sulfide stabilizers of this invention may also be incorporated in the nylon melt prior to spinning into a fiber. The sulfides of the dialkylated phenols of this invention may be used in amounts from .0001 to .5 part per part by weight of nylon cord being treated.

Nylon cords stabilized in accordance with the present invention are particularly useful as reinforcing elements in the manufacture of rubbery articles, particularly rubbery articles that are subjected to high temperature conditions as is encountered for example in a pneumatic tire and other similar pneumatic structures. Any rubbery material may be reinforced with nylon cords stabilized in accordance with this invention, including natural rubber and the synthetic rubbers such as the rubbery copolymers of butadiene and styrene and the rubbery copolymers of butadiene and acrylonitrile and the rubbery copolymers of butadiene and vinyl pyridine and polymers of butadiene-1,3, isoprene, 2-chloro butadiene-1,3, and isobutylene as well as interpolymers of these and similar materials with each other or with other polymerizable monomers as styrene, acrylonitrile, methacrylonitrile, methyl methacrylate, ethyl methacrylate, 2-vinyl pyridine, and similar monomeric materials.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter comprising a macromolecular synthetic linear polyamide of a monomer selected from the group consisting of monoamino-carboxylic acids, and amide-forming derivatives of monoamino-carboxylic acids, and a polyamide of a mixture of at least one diamine and at least one dicarboxylic acid, and a polyamide of a mixture of at least one amide-forming derivative of a diamine and at least one amide-forming derivative of a dicarboxylic acid and a heat-stabilizing amount of a sulfide of dialkylated phenol having the general formula

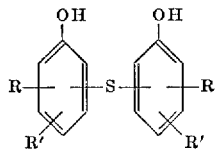

in which R and R' are alkyl groups containing from 1 to 5 carbon atoms, said polyamide being one having recurring amide groups as an integral part of the main polymer chain.

2. A composition of matter comprising a macromolecular synthetic linear polyamide of a monomer selected from the group consisting of monoamino-carboxylic acids, and amide-forming derivatives of monoamino-carboxylic acids, and a polyamide of a mixture of at least one diamine and at least one dicarboxylic acid, and a polyamide of a mixture of a least one amide-forming derivative of a diamine and at least one amide-forming derivative of a dicarboxylic acid and a heat-stabilizing amount of bis(2-methyl-4-hydroxy-5-tertiary butyl phenyl) sulfide.

3. A composition of matter comprising a macromolecular synthetic linear polyamide of a monomer selected from the group consisting of monoamino-carboxylic acids, and amide-forming derivatives of monoamino-carboxylic acids, and a polyamide of a mixture of at least one diamine and at least one dicarboxylic acid, and a polyamide of a mixture of at least one amide-forming derivative of a diamine and at least one amide-forming derivative of a dicarboxylic acid and a heat-stabilizing amount of a mixture of bis(2-methyl-4-hydroxy-5-tertiary butyl phenyl) sulfide, bis(2-hydroxy-3-tertiary butyl-6-methyl phenyl) sulfide, and (2-hydroxy-3-tertiary butyl-6-methyl phenyl) (2-methyl-4-hydroxy-5-tertiary butyl phenyl) sufide.

4. A composition of matter comprising a macromolecular synthetic linear polyamide of a monomer selected from the group consisting of monoamino-carboxylic acids, and amide-forming derivatives of monoamino-carboxylic acids, and a polyamide of a mixture of at least one diamine and at least one dicarboxylic acid, and a polyamide of a mixture of at least one amide-forming derivative of a diamine and at least one amide-forming derivative of a dicarboxylic acid and from about 0.0001 to about 0.5 part by weight per part of polyamide of a sulfide of dialkylated phenol having the general formula

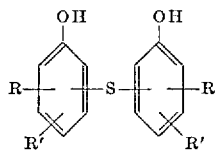

in which R and R' are alkyl groups containing from 1 to 5 carbon atoms, said polyamide being one having recurring amide groups as an integral part of the main polymer chain.

5. A method of treating a macromolecular synthetic linear polyamide cord which comprises treating said polyamide cord with a heat-stabilizing amount of a sulfide of dialkylated phenol having the general formula

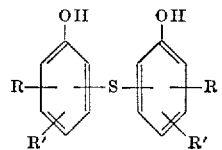

in which R and R' are alkyl groups containing from 1 to 5 carbon atoms, said polyamide being one having recurring amide groups as an integral part of the main polymer chain.

References Cited in the file of this patent
UNITED STATES PATENTS

| | | |
|---|---|---|
| 2,705,227 | Stamatoff | Mar. 29, 1955 |
| 2,929,801 | Koller | Mar. 22, 1960 |

FOREIGN PATENTS

| | | |
|---|---|---|
| 796,285 | Great Britain | June 11, 1958 |

UNITED STATES PATENT OFFICE
CERTIFICATE OF CORRECTION

Patent No. 3,086,960 April 23, 1963

Nelson C. Bletso

It is hereby certified that error appears in the above numbered patent requiring correction and that the said Letters Patent should read as corrected below.

Column 3, lines 11, 32 and 43 and column 4, line 6, after "polyamide", each occurrence, insert -- selected from the group consisting of a polyamide --.

Signed and sealed this 8th day of August 1967.

(SEAL)
Attest:

Edward M. Fletcher, Jr.
Attesting Officer

EDWARD J. BRENNER
Commissioner of Patents